(12) United States Patent
Chen et al.

(10) Patent No.: US 11,581,542 B2
(45) Date of Patent: Feb. 14, 2023

(54) ORGANIC SMALL-MOLECULE CATHODE MATERIAL OF LITHIUM-ION BATTERY AND FABRICATING METHOD THEREOF, AND LITHIUM-ION BATTERY

(71) Applicant: NATIONAL CHENG KUNG UNIVERSITY, Tainan (TW)

(72) Inventors: Teng-Hao Chen, Tainan (TW); Watchareeya Kaveevivitchai, Tainan (TW); Meng-Siou Wu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 216 days.

(21) Appl. No.: 17/175,669

(22) Filed: Feb. 14, 2021

(65) Prior Publication Data

US 2022/0149373 A1    May 12, 2022

(30) Foreign Application Priority Data

Nov. 11, 2020    (TW) .................................. 109139414

(51) Int. Cl.
*H01M 4/60* (2006.01)
*H01M 4/04* (2006.01)
*H01M 10/0525* (2010.01)

(52) U.S. Cl.
CPC ........... *H01M 4/60* (2013.01); *H01M 4/0471* (2013.01); *H01M 4/0497* (2013.01); *H01M 10/0525* (2013.01)

(58) Field of Classification Search
None
See application file for complete search history.

(56) References Cited

U.S. PATENT DOCUMENTS 9,960,451 B1 *   5/2018  Zhamu .................. H01M 4/625
2018/0294474 A1  10/2018  Zhamu et al.

OTHER PUBLICATIONS

Jinquan Wang, Kaize Tee, Yuhang Lee, Siti Nurhanna Riduan and Yugen Zhang Hexaazatriphenylene derivatives/GO composites as organic cathodes for lithium ion batteries JMCA,6(6) 2752-2757,2018.

* cited by examiner

*Primary Examiner* — Brian R Ohara
*Assistant Examiner* — Patrick Marshall Greene
(74) *Attorney, Agent, or Firm* — Mark M. Friedman

(57) ABSTRACT

A cathode material of a lithium-ion battery and a fabricating method thereof, and a lithium-ion battery are described. The cathode material of the lithium-ion battery has hexaazatriphenylene embedded quinone (HATAQ) and/or its derivative small molecules, which have multiple redox-active sites and can form intermolecular hydrogen bonds to form a graphite-like layered structure. When HATAQ and/or its derivative small molecules are used as a cathode material, a stable structure can be maintained during a charge and discharge process and during lithium ions entering and exiting.

13 Claims, 7 Drawing Sheets

ORGANIC SMALL-MOLECULE CATHODE MATERIAL OF LITHIUM-ION BATTERY AND FABRICATING METHOD THEREOF, AND LITHIUM-ION BATTERY

CROSS REFERENCE TO RELATED APPLICATION

This application claims priority to Taiwan Patent Application No. 109139414, filed on Nov. 11, 2020, which is incorporated herein by reference in its entirety.

FIELD OF DISCLOSURE

The present disclosure relates to batteries, and more particularly to a cathode material of a lithium-ion battery and a fabricating method thereof, and a lithium-ion battery.

BACKGROUND OF DISCLOSURE

In recent years, lithium-ion batteries have been widely used in various electronic products, electric vehicles, or energy storage devices. Therefore, many researches are focused on improving an efficiency, an energy density and safety of lithium-ion batteries. However, existing lithium-ion batteries have insufficient capacity at low current density (for example, 400 mA/g) or at high current density (for example, 8000 mA/g). Therefore, both the capacity and a charge/discharge rate capability need to be improved.

Therefore, it is necessary to provide a cathode material of a lithium-ion battery and a fabricating method thereof, and a lithium-ion battery to solve problems of conventional technologies.

SUMMARY OF DISCLOSURE

An object of the present disclosure is to provide a cathode material of a lithium-ion battery, which has multiple redox-active sites and can form intermolecular hydrogen bonds (C—H . . . O bonds) to form a graphite-like layered structure.

Another object of the present disclosure is to provide a method for fabricating a cathode material of a lithium-ion battery, which utilizes specific steps to form the cathode material of the lithium-ion battery according to an embodiment of the present disclosure.

A further object of the present disclosure is to provide a lithium-ion battery comprising the cathode material of the lithium-ion battery according to an embodiment of the present disclosure, which has a capacity of 515 mAh/g at a current density of 200 mA/g, and has a capacity of 209 mAh/g at a current density of 10000 mA/g.

To achieve the above object, the present disclosure provides a cathode material of a lithium-ion battery, comprising at least one compound with following formula (1) of:

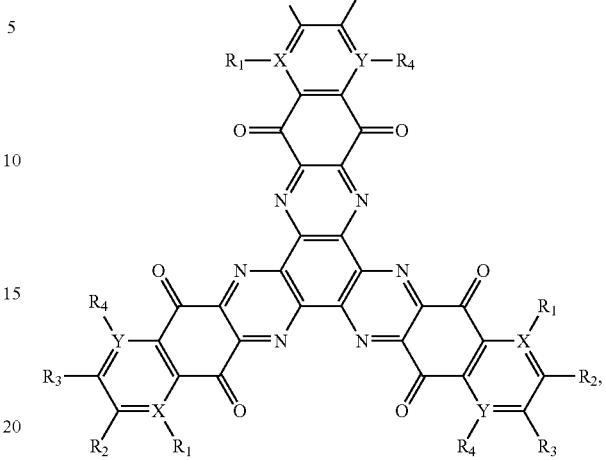

wherein each of $R_1$ to $R_4$ is selected from a group consisting of hydrogen, hydrocarbon, halogen, alkoxy, arylamine, ester, amide, aromatic hydrocarbon, heterocyclic compound, nitro, and nitrile (—CN) group;

wherein one of X and Y is C or N, and the other of X and Y is C; and wherein $R_1$ is removed when X is N, or $R_4$ is removed when Y is N.

In an embodiment of the present disclosure, at least one of $R_1$ to $R_4$ has hydrogen.

In an embodiment of the present disclosure, each of $R_1$ to $R_4$ is hydrogen.

In an embodiment of the present disclosure, at least one compound comprises a plurality of compound molecules with formula (1), wherein at least one intermolecular hydrogen bond is formed between the plurality of compound molecules.

To achieve another object, the present disclosure provides a method of fabricating a cathode material of a lithium-ion battery, comprising steps of:

adding a first compound and a second compound in a solvent to form a first solution, wherein a molar ratio of the first compound and the second compound is between 2 and 5, and the first compound and the second compound are respectively represented by following formula (2) and formula (3):

wherein each of $R_1$ to $R_4$ is selected from a group consisting of hydrogen, hydrocarbon, halogen, alkoxy, arylamine, ester, amide, aromatic hydrocarbon, heterocyclic compound, nitro, and nitrile (—CN) group; wherein one of X and Y is C or N, and the other of X and Y is C; and wherein $R_1$ is removed when X is N, or $R_4$ is removed when Y is N; and

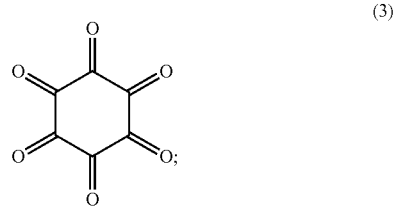

(3)

heating the first solution at 100 to 140° C. for 18 to 30 hours under a protective gas environment;
cooling and filtering the first solution to obtain a solid semi-finished product;
adding the solid semi-finished product to an acidic solution to form a suspension, and heating the second solution at 90 to 110° C. for 1 to 3 hours; and
cooling and filtering the suspension to obtain the cathode material of the lithium-ion battery, wherein the cathode material of the lithium-ion battery comprises at least one compound with following formula (1) of:

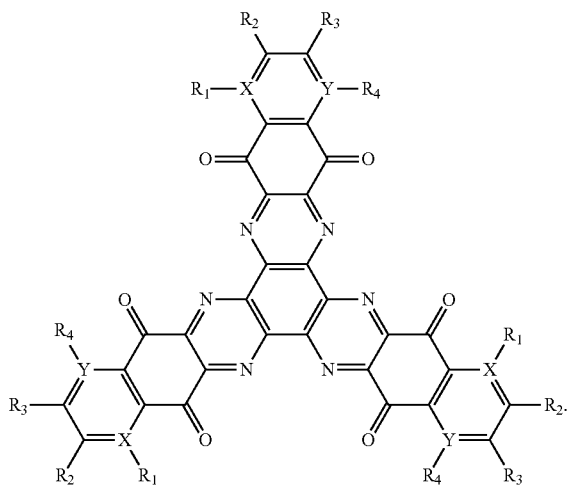

(1)

In an embodiment of the present disclosure, at least one of $R_1$ to $R_4$ has hydrogen.

In an embodiment of the present disclosure, each of $R_1$ to $R_4$ is hydrogen.

In an embodiment of the present disclosure, after the step of cooling and filtering the first solution and before the step of adding the solid semi-finished product to the acidic solution to form the suspension, the method further comprises a step of: washing the solid semi-finished product with glacial acetic acid, ethanol, acetone, and water in sequence, and drying the solid semi-finished product under vacuum for 18 to 30 hours.

In an embodiment of the present disclosure, after the step of cooling and filtering the suspension to obtain the cathode material of the lithium-ion battery, the method further comprises a step of: washing the cathode material of the lithium-ion battery with deionized water, and drying the cathode material of the lithium-ion battery under vacuum for 6 to 12 hours.

To achieve the above object, the present disclosure provides a lithium-ion battery, comprising a cathode material of the lithium-ion battery according to any one embodiment described above.

In an embodiment of the present disclosure, at least one of $R_1$ to $R_4$ has hydrogen.

In an embodiment of the present disclosure, each of $R_1$ to $R_4$ is hydrogen.

In an embodiment of the present disclosure, at least one compound comprises a plurality of compound molecules with formula (1), wherein at least one intermolecular hydrogen bond is formed between the plurality of compound molecules.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

An embodiment of the present disclosure provides a cathode material of a lithium-ion battery, comprising at least one compound with following formula (1) of:

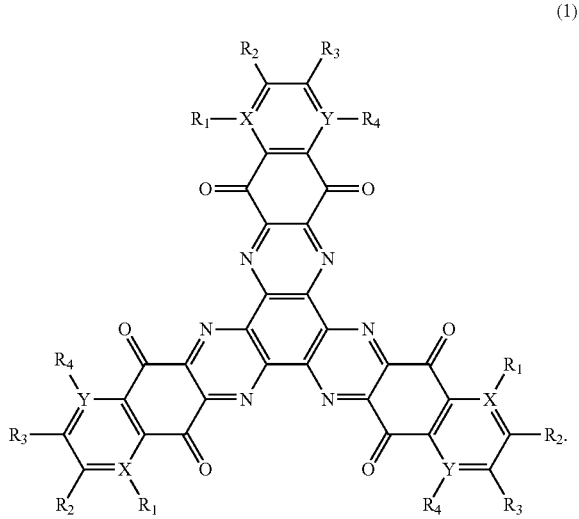

(1)

It is noted that, each of $R_1$ to $R_4$ in the formula (1) is selected from a group consisting of hydrogen, hydrocarbon, halogen, alkoxy, arylamine, ester, amide, aromatic hydrocarbon, heterocyclic compound, nitro, and nitrile group. Further, one of X and Y is C (carbon) or N (nitrogen), and the other of X and Y is C. That is, there may be three situations of X and Y, in which (X,Y) can be (C,C), (C,N), or (N,C). It is noted that, if X is N, then $R_1$ is removed; or if Y is N, then $R_4$ is removed.

In an embodiment, at least one of $R_1$ to $R_4$ has hydrogen, which can form at least one hydrogen bond between molecules of compound (C—H . . . O bonds). In another embodiment, each of $R_1$ to $R_4$ is hydrogen, which can form at least one hydrogen bond between molecules of compound (C—H . . . O bonds).

Figure 2:
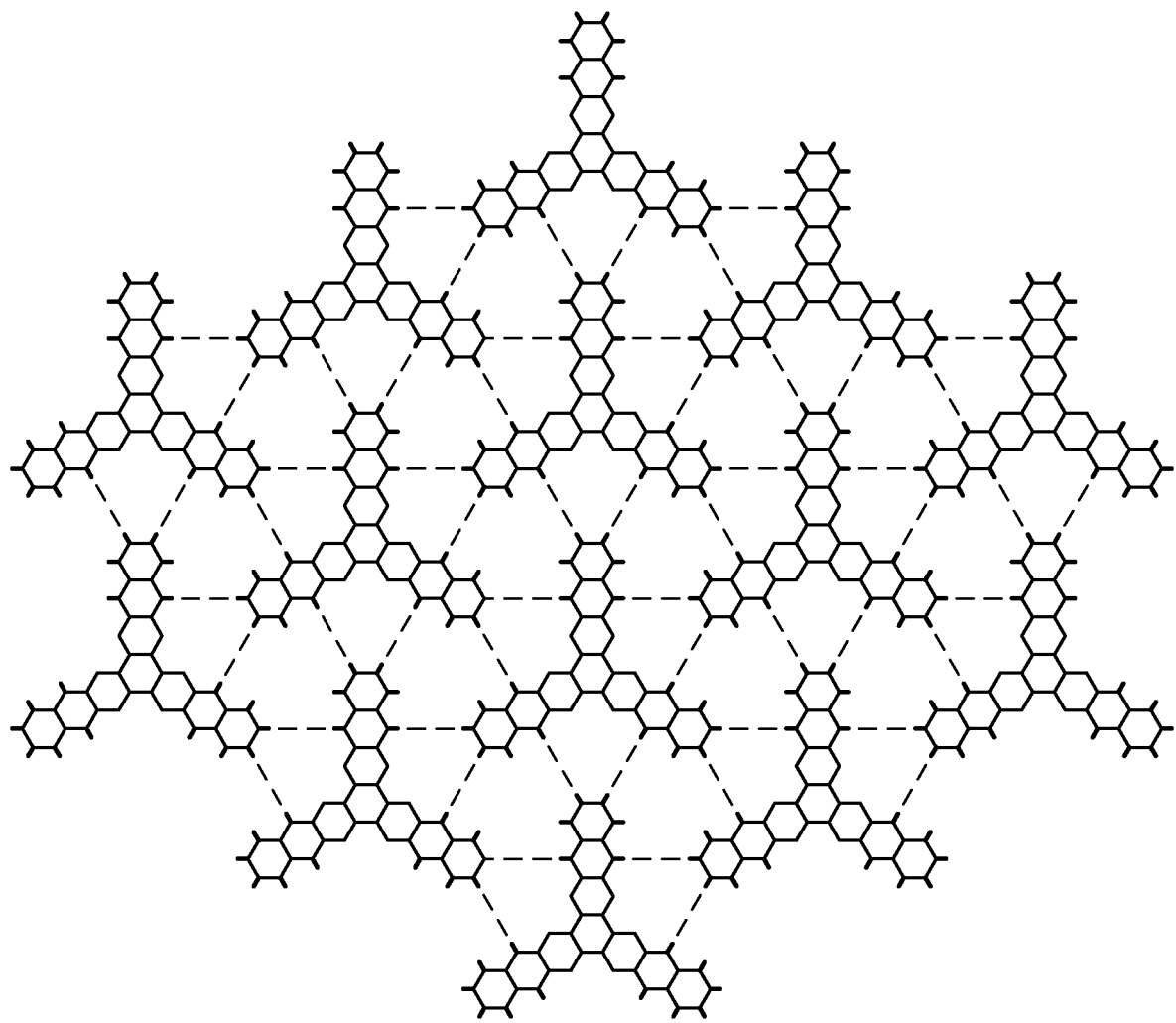
FIG. 2 is a schematic diagram of a graphite-like layered structure formed by a cathode material of a lithium-ion battery according to an embodiment of the present disclosure.

It is further illustrated that when each of $R_1$ to $R_4$ in formula (1) is hydrogen, intermolecular hydrogen bonds can be formed between a plurality of compound molecules with formula (1). As shown in FIG. 2 (both X and Y are C), each of the plurality of compound molecules can form intermolecular hydrogen bonds with oxygen (e.g., oxygen adjacent to $R_1$ or $R_4$) of another of the plurality of compound molecules through the hydrogen located at the $R_2$ or $R_3$ position (referring to formula (1)). However, it should be mentioned that the $R_1$ or $R_4$ may also form an intermolecular hydrogen bond with oxygen of another compound molecule (e.g., oxygen adjacent to $R_1$ or $R_4$). In other words, each hydrogen at $R_1$, $R_2$, $R_3$, and $R_4$ has an opportunity to form intermolecular hydrogen bonds with the oxygen of another compound molecule.

Specifically, by designing and synthesizing electron-accepting hexaazatriphenylene (HAT) embedded quinone (HATAQ) and/or its derivative small molecules (e.g., formula (1)), it can form intermolecular hydrogen bonds, so as to form a graphite-like layered structure. Therefore, when HATAQ and/or its derivative small molecules are used as a cathode material, a stable structure can be maintained during a charge and discharge process and during lithium ions entering and exiting. Therefore, using HATAQ and/or its derivative small molecules as a cathode material can exhibit excellent charge and discharge rate capability results. For example, when a current density is 200 mA/g, the cathode material has a capacity of about 515 mAh/g; when an ultra-high current density is 10000 mA/g, the cathode material has a reversible capacity of about 209 mAh/g after 1000 cycles of charge and discharge, and maintains about 85% of the capacity.

Figure 1:
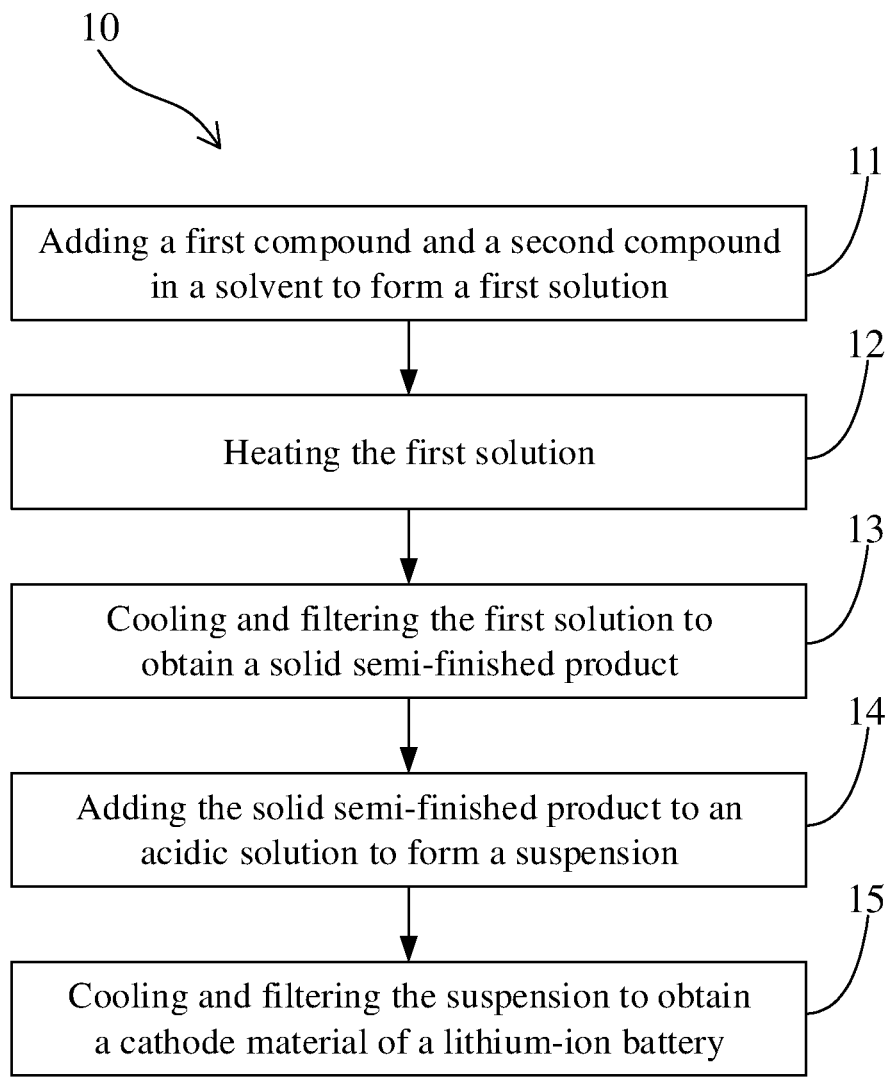
FIG. 1 is a schematic flowchart of a method of fabricating a cathode material of a lithium-ion battery according to an embodiment of the present disclosure.

Referring to FIG. 1, an embodiment of the present disclosure provides a method 10 of fabricating a cathode material of a lithium-ion battery, which mainly comprises following steps 11 to 15 of:

(step 11): adding a first compound and a second compound in a solvent to form a first solution, wherein a molar ratio of the first compound and the second compound is between 2 and 5, and the first compound and the second compound are respectively represented by following formula (2) and formula (3):

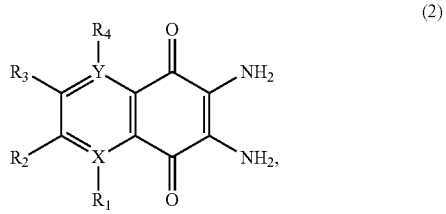

(2)

wherein each of $R_1$ to $R_4$ is selected from a group consisting of hydrogen, hydrocarbon, halogen, alkoxy, arylamine, ester, amide, aromatic hydrocarbon, heterocyclic compound, nitro, and nitrile group, and wherein one of X and Y is C or N, and the other of X and Y is C; and

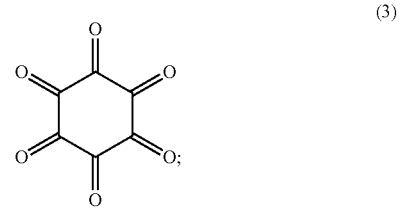 [SMILES: O=C1C(=O)C(=O)C(=O)C(=O)C1=O]

(3)

(step 12): heating the first solution at 100 to 140° C. for 18 to 30 hours under a protective gas environment;

(step 13): cooling and filtering the first solution to obtain a solid semi-finished product;

(step 14): adding the solid semi-finished product to an acidic solution to form a suspension, and heating the suspension at 90 to 110° C. for 1 to 3 hours; and (step 15): cooling and filtering the suspension to obtain the cathode material of the lithium-ion battery, wherein the cathode material of the lithium-ion battery comprises at least one compound with following formula (1) of:

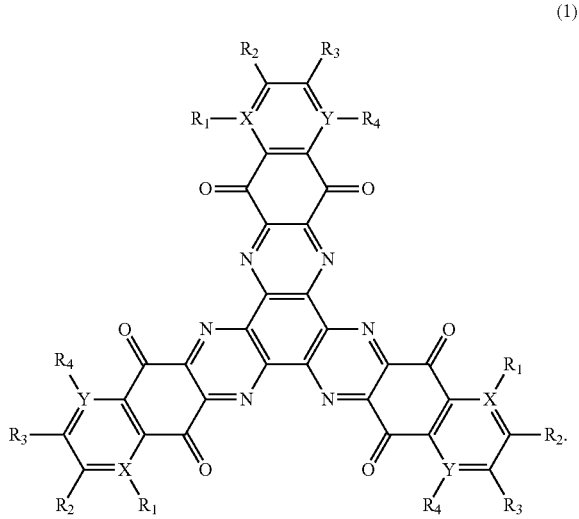

(1)

In the present disclosure, the implementation details and principles of the above-mentioned steps of the embodiments are described in detail below in sequence.

At first, the method 10 of fabricating a cathode material for a lithium-ion battery according to an embodiment of the present disclosure has a step 11 of: adding a first compound and a second compound in a solvent to form a first solution, wherein a molar ratio of the first compound and the second compound is between 2 and 5, and the first compound and the second compound are respectively represented by the above formula (2) and formula (3). In step 11, the first compound can be referred to as 2,3-diamino-1,4-naphtaquinone (i.e., both X, Y are C; and $R_1$ to $R_4$ are H) and/or its derivatives. Further, the second compound can be referred to as cyclohexane hexaketone, which is generally present in the form of eight water molecules (cyclohexane hexaketone octahydrate). In an embodiment, at least one of $R_1$ to $R_4$ in formula (2) has hydrogen, which can form at least one hydrogen bond between molecules of compound (C—H . . . O bonds). In another embodiment, each of $R_1$ to $R_4$ in formula (2) is hydrogen, which can form at least one hydrogen bond between molecules of compound (C—H . . . O bonds).

In an embodiment, considering the structural formula of the product (i.e., formula (1)), a molar ratio of the first compound and the second compound can be about 3, but the molar ratio can also be 2.5, 3.5, 4, or 4.5. In the case where the molar ratio is greater than 5 or less than 2, an excessive use of either the first compound or the second compound results in waste of cost. In another embodiment, the solvent may be a solvent that can dissolve the first compound and the second compound, and does not negatively affect the prepared cathode material. In an example, the solvent may be degassed glacial acetic acid. In another example, a molar concentration of the first compound and the solvent is such as between 0.15 and 0.25 M, and a molar concentration of the second compound and the solvent is such as between 0.05 and 0.1 M.

Then, the method 10 of fabricating a cathode material for a lithium-ion battery according to an embodiment of the present disclosure has a step 12 of: heating the first solution at 100 to 140° C. for 18 to 30 hours under a protective gas environment. In step 12, an appropriate heating temperature is mainly applied to cause the first compound to react with the second compound. In an embodiment, the protective gas may be at least one of nitrogen, helium, neon, and argon. In an example, the step 12 is performed by heating the first solution under reflux at about 120° C. for about 24 hours in an argon atmosphere. In another example, the aforementioned temperature is, for example, 105, 110, 115, 120, 125, 130, or 135° C. In another example, the aforementioned time is, for example, 19, 20, 21, 22, 24, 26, 27, 28, or 29 hours.

Then, the method 10 of fabricating a cathode material for a lithium-ion battery according to an embodiment of the present disclosure has a step 13 of: cooling and filtering the first solution to obtain a solid semi-finished product. In step 13, a dark brown solid semi-finished product can be obtained by cooling (for example, cooling to about 50 to 70° C., such as about 60° C.) and filtering.

In an embodiment, after the step 13 of cooling and filtering the first solution and before the step 14 of adding the solid semi-finished product to the acidic solution to form the suspension, the method 10 further comprises a step of: washing the solid semi-finished product with glacial acetic acid, ethanol, acetone, and water in sequence, and drying the solid semi-finished product under vacuum for 18 to 30 hours, so as to remove impurities attached onto the solid semi-finished product.

Then, the method 10 of fabricating a cathode material for a lithium-ion battery according to an embodiment of the present disclosure has a step 14 of: adding the solid semi-finished product to an acidic solution to form a suspension, and heating the suspension at 90 to 110° C. for 1 to 3 hours. In step 14, for example, the obtained solid semi-finished product is added to 25% nitric acid ($HNO_3$) to form a suspension with the solid semi-finished product (i.e., the suspension). The obtained suspension is heated under reflux with vigorous stirring at about 100° C. for about 2 hours. After the reaction, the suspension with the solid semi-finished product changed from dark brown to dark orange.

Then, the method 10 of fabricating a cathode material for a lithium-ion battery according to an embodiment of the present disclosure has a step 15 of: cooling and filtering the suspension to obtain the cathode material of the lithium-ion battery, wherein the cathode material of the lithium-ion battery comprises at least one compound with the above formula (1). In step 15, the orange-yellow cathode material of the lithium-ion battery can be obtained by cooling (for example, cooling to room temperature, such as about 25° C.) and filtering through a filter (for example, a glass filter). In one embodiment, the cathode material of the lithium-ion battery can be washed with deionized water, and the cathode material of the lithium-ion battery can be dried under vacuum for 6 to 12 hours. In one example, the cathode material of the lithium-ion battery can be washed repeatedly (for example, 3 to 7 times) with deionized water and the cathode material of the lithium-ion battery can be dried under vacuum for about 8 hours (for example, overnight), so as to obtain the cathode material of the lithium-ion battery.

It can be seen from the above that the fabricating method 10 of an embodiment of the present disclosure can be used to prepare the cathode material (i.e., formula (1)) of a lithium-ion battery as described above in any embodiment of the present disclosure. Further, the cathode material of the lithium-ion battery prepared by the fabricating method 10 of any one embodiment of the present disclosure can have a same effect as the cathode material of the lithium-ion battery of any one embodiment of the present disclosure, so it will not be repeated.

It should be mentioned that the cathode material (HATAQ) of the lithium-ion battery of the present disclosure is different from other hexaazatriphenylene (HAT) derivatives at least in that: the general HAT (or its derivatives) does not have a quinone structure, nor can it use the C—H bond (or hydrogen at any position of $R_1$-$R_4$) on the benzene ring to form an intermolecular hydrogen bond with the C=O bond.

In addition, it should be mentioned that the present disclosure also provides a lithium-ion battery, which includes the cathode material of the lithium-ion battery as described in any one of the above embodiments. In one embodiment, the present disclosure excludes the application of the positive electrode material to other components of the lithium-ion battery, such as anode material, electrolyte, or separator. In another embodiment, a known cathode material in conventional lithium battery can be replaced with the cathode material according to any one embodiment of the present disclosure, which can improve an original capacity and charge and discharge rate capability.

The following provides specific experimental data analysis to illustrate that the cathode material of the lithium-ion battery of an embodiment of the present disclosure have the above-mentioned effects.

Embodiment 1

2,3-Diamino-1,4-naphtaquinone (61.2 g, 325 mmol) and cyclohexane hexaketone octahydrate (31.2 g, 100 mmol) are dissolved in the degassed glacial acetic acid (1500 mL) to form a first solution. Then, the first solution is heated under reflux at about 120° C. for about 24 hours under a protective gas environment (for example, under an argon atmosphere). After the reaction is completed, the reactive mixture is cooled to about 60° C., and the solid semi-finished product is recovered by filtration. The obtained solid semi-finished product is washed sequentially with glacial acetic acid (for example, about 200 mL), ethanol (for example, about 200 mL), acetone (for example, about 200 mL), and water (for example, about 200 mL), and dried under vacuum for about 24 hours. The obtained solid semi-finished product is added and suspended in an acidic solution (for example, 25% nitric acid, for example, about 250 mL). The resulting suspension is heated under reflux with vigorous stirring at about 100° C. for about 2 hours. After heating, a color of the suspension changed from dark brown to dark orange. Then, the reactive mixture is cooled to room temperature, and the solid (i.e., the cathode material of the lithium-ion battery) is separated by a glass filter. The cathode material of the lithium-ion battery is washed with deionized water (5×500 mL) and then dried under vacuum overnight (about 8 hours). The obtained cathode material (HATAQ) of the lithium-ion battery is an orange powder (about 54.3 g, about 87% yield).

Then, HATAQ is ground and mixed with Ketjen black conductive carbon (Lion Specialty Chemicals Company; Japan) and polyvinylidene fluoride (PVDF) in a weight ratio of about 3:6:1 to form a mixture. Then, the mixture is stirred in N-methylpyrrolidone (NMP) and coated onto carbon paper used as a current collector, so as to serve as a cathode. The cathode is vacuum dried overnight at about 80° C.

Then, the above cathode is used as a cathode of a CR2032 coin cell, where the CR2032 coin cell are assembled by: using Li metal as anode; using 1 M LiTFSI as an electrolyte, which is dissolved in 1,3-dioxolane (DOL) and 1,2-dimethoxyethane (DME) with a volume ratio of about 1:2, and has 0.3 wt % $LiNO_3$; and using a glass fiber filter paper (Whatman Company) as a separator. The cell is manufactured in an argon-filled glovebox with $O_2$ and $H_2O$ levels below 0.3 ppm. Then, galvanostatic charge/discharge and cyclic voltammetry measurements are performed with a battery cycler (Neware company) and BCS-805 system (BioLogic company). The analysis results are shown in FIG. 3A to FIG. 3F.

Figure 3A:
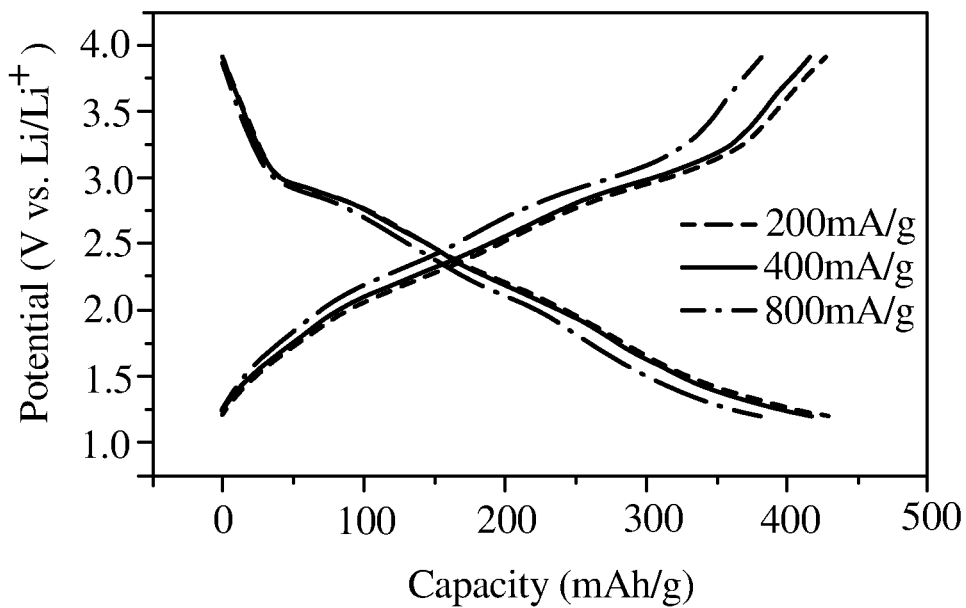
FIG. 3A to FIG. 3C are diagrams of a voltage profile, a cyclic voltammogram (scanning rate of 0.1 mV/s), and a capacity retention analysis of HATAQ at current densities of 200 mA/g to 800 mA/g.
Figure 3B:
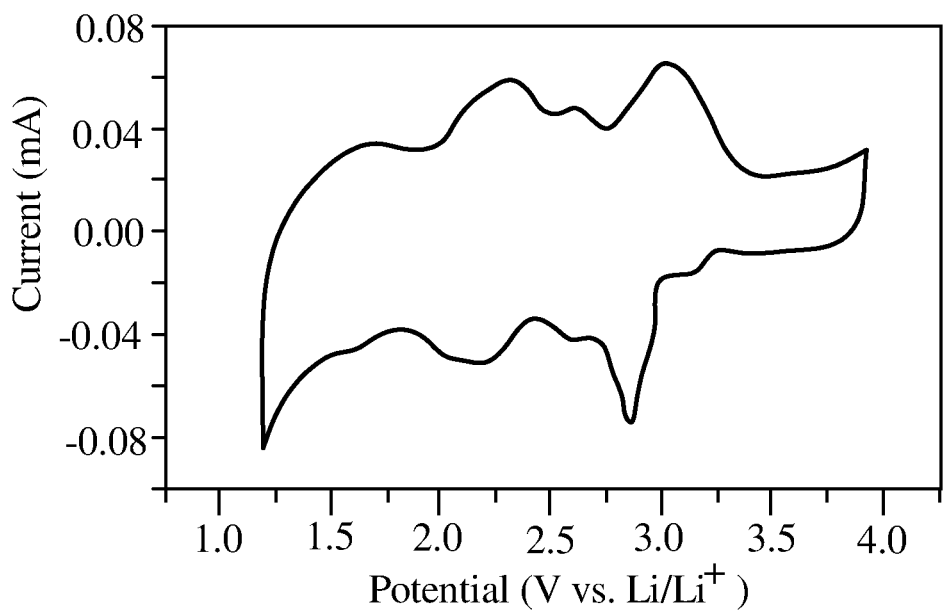
Figure 3C:
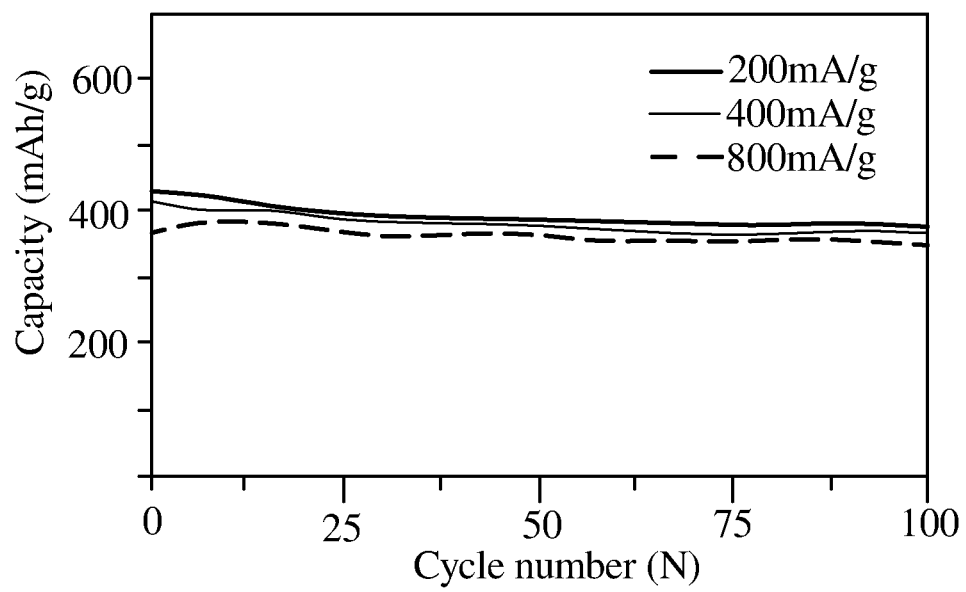
Figure 3D:
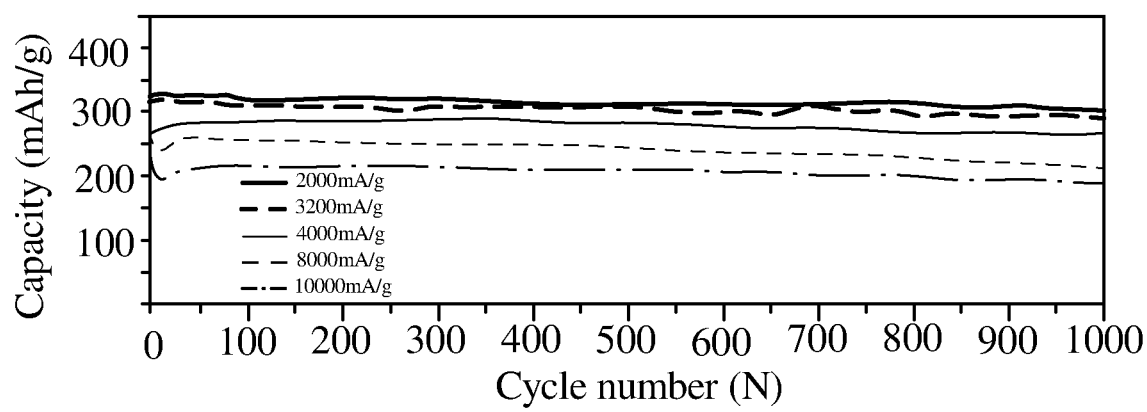
FIG. 3D to 3E are analysis diagrams of the capacity retention of HATAQ at a current density of 2 A/g to 10 A/g and the rate capability of HATAQ at various rates.
Figure 3E:
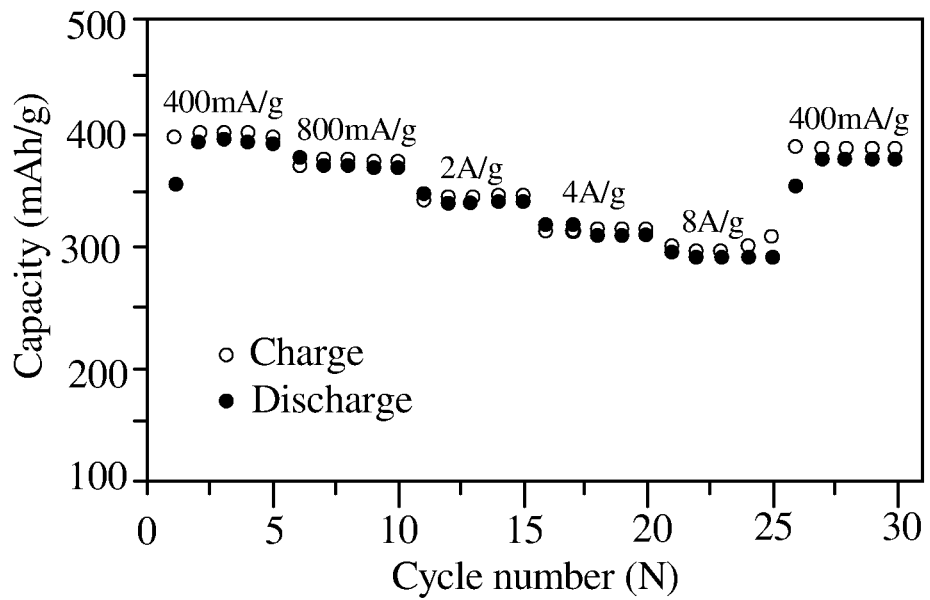
Figure 3F:
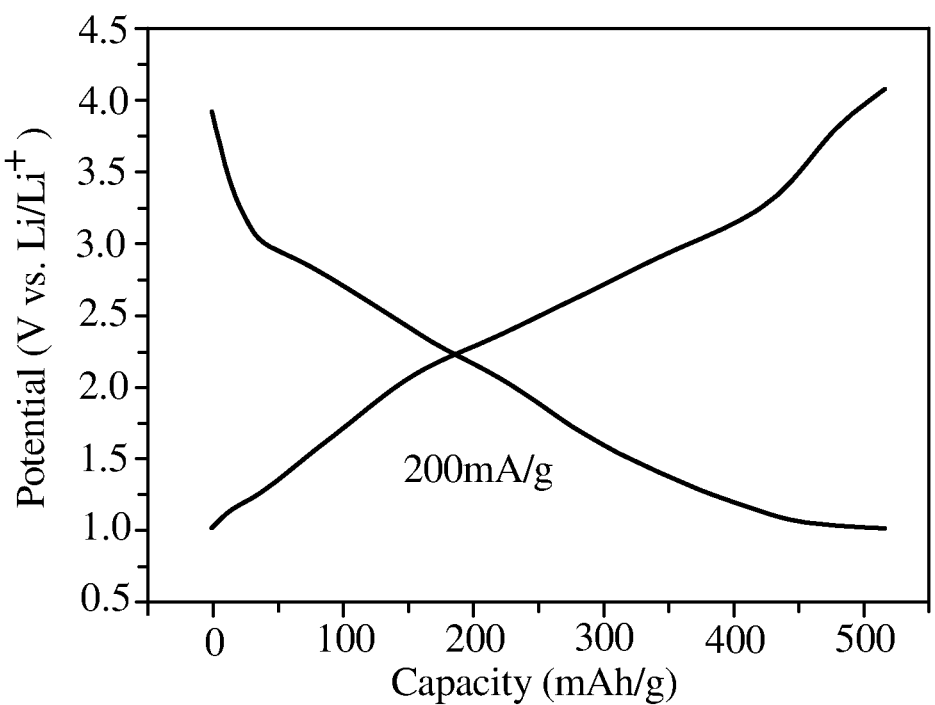
FIG. 3F is another diagram of a voltage profile of HATAQ at current densities of 200 mA/g.

FIG. 3A to FIG. 3F relates to electrochemical properties of HATAQ. FIG. 3A to FIG. 3C are diagrams of a voltage profile (with a cutoff voltage at 1.2-3.9V), a cyclic voltammogram (scanning rate of 0.1 mV/s), and a capacity retention analysis of HATAQ at current densities of 200 mA/g to 800 mA/g. FIG. 3D to 3E are analysis diagrams of the capacity retention of HATAQ at a current density of 2 A/g to 10 A/g and the rate capability of HATAQ at various rates. FIG. 3F is another diagram of a voltage profile (with a cutoff voltage at 1.0-4.0V) of HATAQ at current density of 200 mA/g.

From FIG. 3A to FIG. 3F, it can be seen that using HATAQ and/or its derivative small molecules as a cathode material can exhibit excellent charge and discharge results. For example, when a current density is 200 mA/g, the cathode material has a capacity of about 515 mAh/g (as shown in FIG. 3F); when an ultra-high current density is 10000 mA/g, the cathode material has a reversible capacity of about 209 mAh/g after 1000 cycles of charge and discharge, and maintains about 85% of the capacity.

Embodiments 2 to 4

The fabricating methods of Embodiments 2 to 4 are substantially the same as that of Embodiment 1, but a ratio of DOL to DME used is different (Embodiment 2: a volume ratio of DOL to DME is about 1:1; Embodiment 3: a volume ratio of DOL to DME is about 2:1), or the weight percentage of $LiNO_3$ used is different (Embodiment 4: 1.0 wt % $LiNO_3$).

Figure 4A:
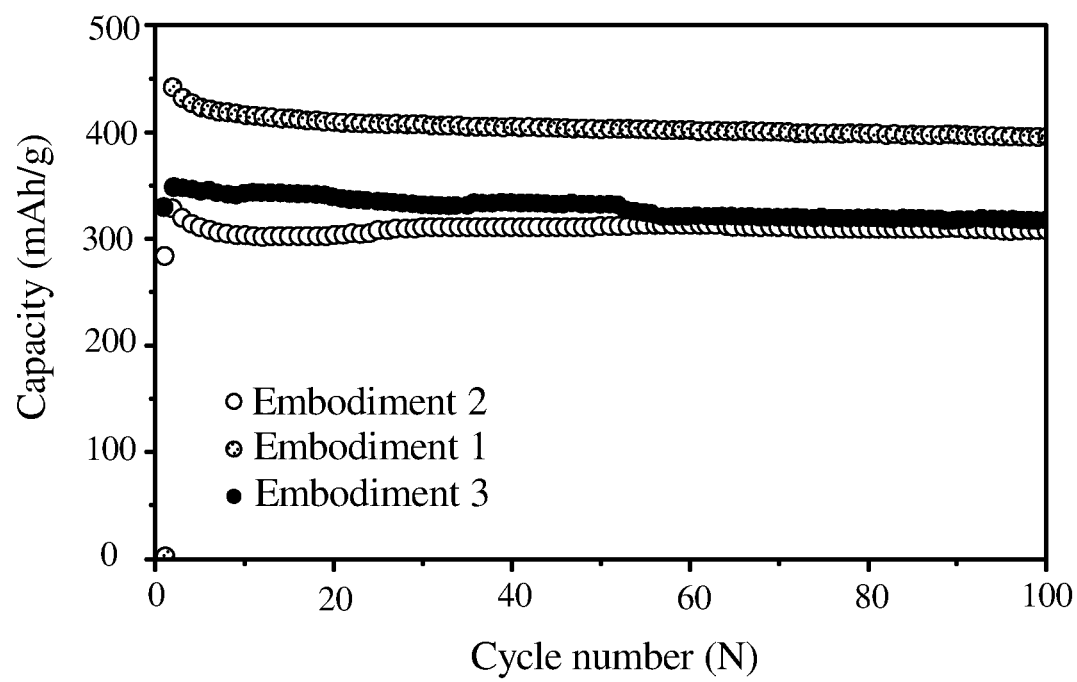
FIG. 4A is an analysis diagram of the capacity retention of Embodiments 1 to 3 at a current density of 800 mA/g.

FIG. 4A is an analysis diagram of the capacity retention of Embodiments 1 to 3 at a current density of 800 mA/g. It can be seen from FIG. 4A that an initial capacity of Embodiment 1 is about 441 mAh/g; an initial capacity of Embodiment 2 is about 327 mAh/g; and an initial capacity of Embodiment 3 is about 348 mAh/g. In principle, after multiple cycles of charge and discharge, Embodiment 1 is far superior to Embodiments 2 and 3.

Figure 4B:
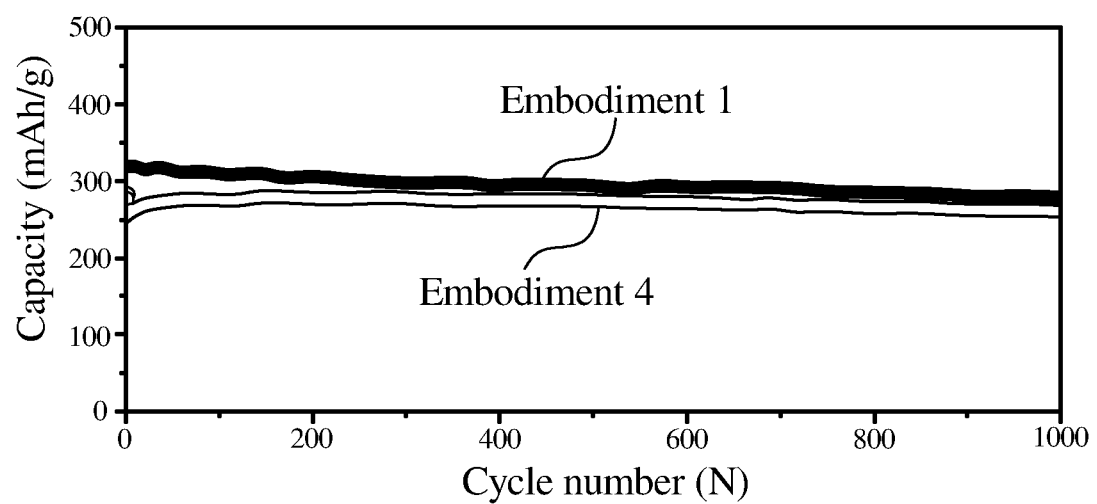
FIG. 4B is an analysis diagram of the capacity retention of Embodiments 1 and 4 at a current density of 3200 mA/g.

FIG. 4B is an analysis diagram of the capacity retention of Embodiments 1 and 4 at a current density of 3200 mA/g. It can be seen from FIG. 4B that an initial capacity of Embodiment 1 is about 315 mAh/g; and an initial capacity of Embodiment 4 is about 277 mAh/g. In principle, after about 1000 cycles of charge and discharge, the capacity of Embodiment 1 (278 mAh/g) is better than that of Embodiment 4 (260 mAh/g). However, Embodiment 4 maintains about 94% of the capacity after 1000 cycles of charge and discharge, and Embodiment 1 maintains about 88% of the specific capacity after 1000 cycles of charge and discharge.

The present disclosure has been described with a preferred embodiment thereof and it is understood that many changes and modifications to the described embodiment can be carried out without departing from the scope and the spirit of the disclosure that is intended to be limited only by the appended claims.

The invention claimed is:

1. A cathode material of a lithium-ion battery, comprising at least one compound molecule with following formula (1) of:

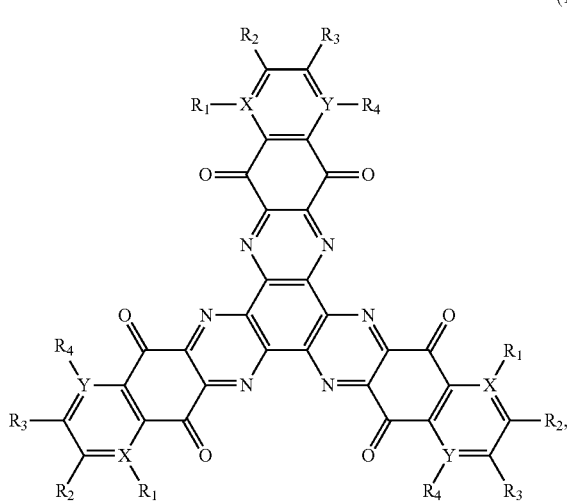

wherein each of $R_1$ to $R_4$ is selected from a group consisting of hydrogen, hydrocarbon, halogen, alkoxy, arylamine, ester, amide, aromatic hydrocarbon, heterocyclic compound, nitro, and nitrile group;

wherein one of X and Y is C or N, and the other of X and Y is C; and wherein $R_1$ is removed when X is N, or $R_4$ is removed when Y is N.

2. The cathode material of the lithium-ion battery according to claim 1, wherein at least one of $R_1$ to $R_4$ has hydrogen.

3. The cathode material of the lithium-ion battery according to claim 1, wherein each of $R_1$ to $R_4$ is hydrogen.

4. The cathode material of the lithium-ion battery according to claim 1, wherein at least one compound comprises a plurality of compound molecules with formula (1), wherein at least one intermolecular hydrogen bond is formed between the plurality of compound molecules.

5. A method of fabricating a cathode material of a lithium-ion battery, comprising steps of:

adding a first compound and a second compound in a solvent to form a first solution, wherein a molar ratio of the first compound and the second compound is between 2 and 5, and the first compound and the second compound are respectively represented by following formula (2) and formula (3):

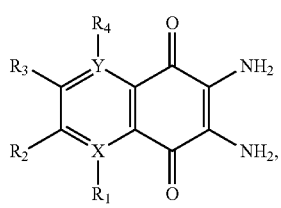

wherein each of $R_1$ to $R_4$ is selected from a group consisting of hydrogen, hydrocarbon, halogen, alkoxy, arylamine, ester, amide, aromatic hydrocarbon, heterocyclic compound, nitro, and nitrile group;

wherein one of X and Y is C or N, and the other of X and Y is C; and wherein $R_1$ is removed when X is N, or $R_4$ is removed when Y is N; and

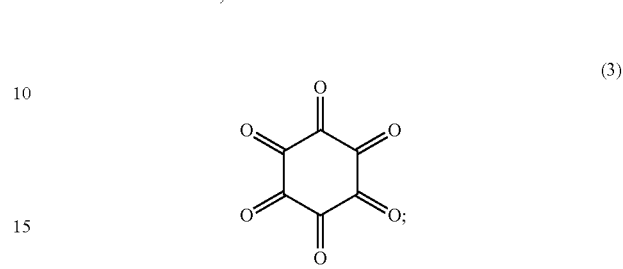

heating the first solution at 100 to 140° C. for 18 to 30 hours under a protective gas environment;

cooling and filtering the first solution to obtain a solid semi-finished product;

adding the solid semi-finished product to an acidic solution to form a suspension, and heating the suspension at 90 to 110° C. for 1 to 3 hours; and cooling and filtering the suspension to obtain the cathode material of the lithium-ion battery, wherein the cathode material of the lithium-ion battery comprises at least one compound molecule with following formula (1) of:

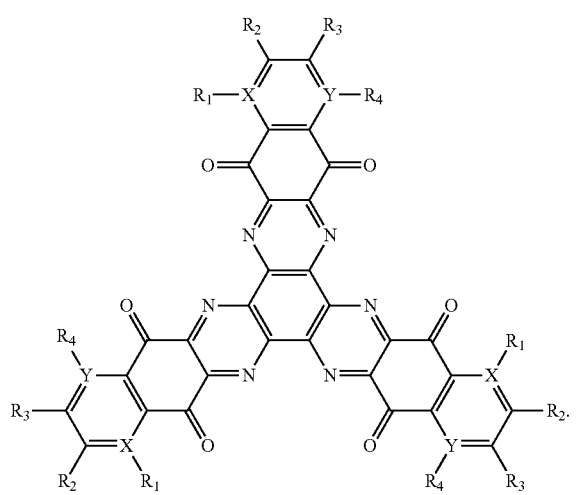

6. The method of fabricating the cathode material of the lithium-ion battery according to claim 5, wherein at least one of $R_1$ to $R_4$ has hydrogen.

7. The method of fabricating the cathode material of the lithium-ion battery according to claim 5, wherein each of $R_1$ to $R_4$ is hydrogen.

8. The method of fabricating the cathode material of the lithium-ion battery according to claim 5, wherein after the step of cooling and filtering the first solution and before the step of adding the solid semi-finished product to the acidic solution to form the suspension, the method further comprises a step of: washing the solid semi-finished product with glacial acetic acid, ethanol, acetone, and water in sequence, and drying the solid semi-finished product under vacuum for 18 to 30 hours.

9. The method of fabricating the cathode material of the lithium-ion battery according to claim 5, wherein after the step of cooling and filtering the suspension to obtain the cathode material of the lithium-ion battery, the method further comprises a step of: washing the cathode material of the lithium-ion battery with deionized water, and drying the cathode material of the lithium-ion battery under vacuum for 6 to 12 hours.

10. A lithium-ion battery, comprising a cathode material of the lithium-ion according to claim 1.

11. The cathode material of the lithium-ion battery according to claim 10, wherein at least one of $R_1$ to $R_4$ has hydrogen.

12. The cathode material of the lithium-ion battery according to claim 10, wherein each of $R_1$ to $R_4$ is hydrogen.

13. The cathode material of the lithium-ion battery according to claim 10, wherein at least one compound comprises a plurality of compound molecules with formula (1), wherein at least one intermolecular hydrogen bond is formed between the plurality of compound molecules.

\* \* \* \* \*